(12) United States Patent
Brown, Jr.

(10) Patent No.: US 7,543,266 B2
(45) Date of Patent: Jun. 2, 2009

(54) LOCK-FREE STATE MERGING IN PARALLELIZED CONSTRAINT SATISFACTION PROBLEM SOLVERS

(75) Inventor: Allen L. Brown, Jr., Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 215 days.

(21) Appl. No.: 11/602,092

(22) Filed: Nov. 20, 2006

(65) Prior Publication Data

US 2008/0120490 A1 May 22, 2008

(51) Int. Cl.
*G06F 17/50* (2006.01)
(52) U.S. Cl. ............................ 716/18; 703/22; 706/10; 706/11; 706/19; 706/26
(58) Field of Classification Search ............... 716/1–18; 703/13–22; 706/10–11, 19, 26
See application file for complete search history.

(56) References Cited

U.S. PATENT DOCUMENTS

| | | | |
|---|---|---|---|
| 4,918,621 A | | 4/1990 | Nado et al. |
| 5,276,775 A | | 1/1994 | Meng |
| 5,469,367 A | * | 11/1995 | Puri et al. ..................... 716/18 |
| 6,038,392 A | * | 3/2000 | Ashar et al. .................. 703/27 |
| 7,203,917 B2 | * | 4/2007 | Ganai et al. .................. 716/5 |
| 2003/0084411 A1 | | 5/2003 | Moskewicz et al. |
| 2005/0021486 A1 | | 1/2005 | Naveh |
| 2005/0216871 A1 | | 9/2005 | Prasad et al. |
| 2005/0222827 A1 | | 10/2005 | Emek et al. |
| 2005/0278702 A1 | | 12/2005 | Koyfman et al. |

FOREIGN PATENT DOCUMENTS

WO WO2006020729 A2 2/2006

OTHER PUBLICATIONS

Marques-Silva et al., GRASP: A Search Algorithm for propositional Satisfiability, May 199, IEEE, vol. 48, pp. 506-521.*

* cited by examiner

*Primary Examiner*—Jack Chiang
*Assistant Examiner*—Nghia M Doan

(57) ABSTRACT

Solver state merging in parallel constraint satisfaction problem (CSP) solvers. Solver state during processing of a computational thread of parallel CSP solvers is represented as a set of support graphs. The support graphs are merged in a pairwise fashion, yielding a new conflict-free graph. The merge process is free of cycles, conflicts are removed, and thread processing is lock-free. The architecture can be applied, generally, in any CSP solver (e.g., a Boolean SAT solver) having certain formal properties. A system is provided that facilitates solver processing, the system comprising a bookkeeping component for representing input solver state of a computational thread as a set of graphs, and a merge component for pairwise merging of at least two input graphs of the set of graphs into a merged graph that represents final state of the computational thread.

13 Claims, 16 Drawing Sheets

LOCK-FREE STATE MERGING IN PARALLELIZED CONSTRAINT SATISFACTION PROBLEM SOLVERS

BACKGROUND

Technological advances in hardware such as processors, memory, and storage continue to serve as a catalyst for creating larger and more complex software applications that provide a richer user experience by handling many different types of data types of media (e.g., voice, text and video), development programs, and so on.

The hardware support counted on by these vendors in single-processor systems may be distant because historical circuit speedups associated with Moore's law no longer appear to be readily obtainable. The principle aspect of Moore's law is that approximately every eighteen months the number of transistors on a chip will double due, generally, to technological advances in device fabrication. Historically, when this was accomplished, the processor clock speed could also be increased. However, the heat density now associated with the more tightly packed transistors is so high that increasing the clock speed means heat cannot be efficiently and effectively dissipated. Thus, smaller devices no longer directly translate into faster and cooler running machines.

One alternative being exploited is to simply employ more of the devices. In other words, in the realm of processors, for example, design parallel or multi-processor systems to accommodate the software demands. However, parallel processing systems require sophisticated coordination techniques for handling algorithms or computational thread processing. Constraint solving is useful in testing these coordination techniques. Traditional sequential algorithms, however, are notoriously difficult to reconstruct in ways that make effective use of all available shared-memory parallel processors.

Constraint satisfaction problem (CSP) solvers—such as Boolean satisfiability (SAT) solvers—are in no way exceptions to the previous observation. Typically, sequential CSP solvers have a current state that includes a partial solution (an assignment to some of the constraint variables) from which the solver attempts to move to a new state with an augmented solution created by assigning one or more currently unassigned variables. The new assignmentation may engender other assignments through the propagation of constraints. Propagation of constraints, in turn, can lead to the detection of a conflict among the current assignments which (in order to relieve the conflict) must be partially undone, changed to new assignments, and re-propagated.

In parallel processing systems, a parallel implementation of this problem solving regime per force has several parallel computations propagating constraints in the fashion just described. A problem is to merge several conflict-free solver states (post propagation) into a single conflict-free solver state.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture provides support for parallel processing in generic constraint satisfaction problem (CSP) solvers. The state of a computational thread of the solvers is represented as a set of support graphs. Sets of support graphs are a recognized mechanism in the efficient implementation of truth maintenance systems (TMS), which are frequently an important component of generic CSP solvers. As described herein, the support graphs are used in a new way by merging the graphs in a pairwise fashion, yielding a new conflict-free graph. This allows construction of a CSP solver by mapping parallel propagation of constraints over multiple new assignments and reducing to a new problem solver state (with more variables assigned) by merging the states resulting from the multiple propagations. The architecture can be applied, generally, in any CSP solver having certain formal properties. For example, in one implementation, the architecture can be applied specifically in the context of a Boolean satisfiability (SAT) solver.

The architecture disclosed and claimed herein comprises a computer-implemented system that facilitates solver processing. The system includes a bookkeeping component for representing input solver state of a computational thread as a set of graphs. A merge component performs pairwise merging of at least two input graphs of the set of graphs into a merged graph that represents final state of the computational thread.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
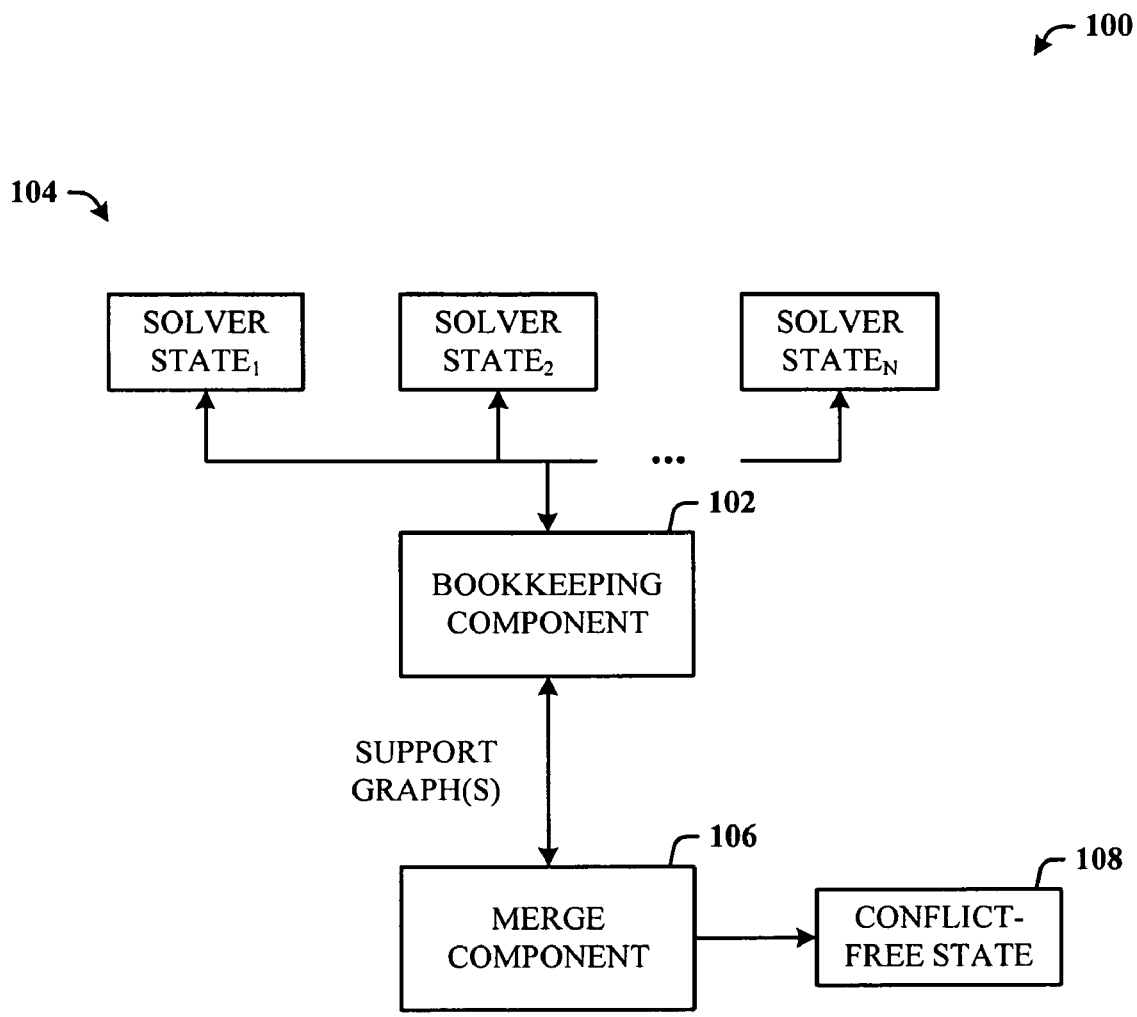
FIG. 1 illustrates a system that facilitates solver processing in accordance with a parallel implementation.

The disclosed architecture provides a solution for shared-memory parallel processor systems that, conventionally, have notoriously been difficult to address even as a sequential problem. The innovation provides lock-free state merging in parallel constraint satisfaction problem (CSP) solvers. The state of a computational thread of the solvers is represented as a set of support graphs. (In the interest of simplicity, the phrase "support graph" will be used rather than "set of support graphs", when no confusion will ensue.) These support graphs are used in a new way by merging the graphs in a pairwise fashion describing a process that is lock-free and which yields a new conflict-free support graph. The architecture can be applied, generally, in any CSP solver where the underlying problem is reducible to Boolean satisfiability, and in one specific implementation, the architecture can be applied specifically in the context of a Boolean satisfiability (SAT) solver.

In the specific implementation of SAT solvers, the SAT solver problem begins with a set of Boolean formulae that engender the problem in one of two ways. It is desired to know whether the formula is always true. Put another way, it is desired to determine if the formula is a theorem. An equivalent question, by taking the complement (or negation) of any formula, is to determine if the formula is satisfiable. That is to ask, is there an assignment of variables that makes the formula true? For purposes of mechanization, this can be a way the problem is approached. It is attacked as a satisfiability problem and not a theorem proving problem.

In the space of digital design, it is desired to know whether a Boolean formula is a theorem or not. Rather than proving the formula to be shown is a theorem, show that the negation is not satisfiable. The Boolean formula is presented in a canonical form such as a disjunctive normal form, for example. The disjunctive normal form is a representation where the set of formulae is finite, and there are only two logical connectives that occur in any one of the formulae—a negation sign (logical NOT) and the disjunction (or logical OR). Accordingly, in order for the original problem, now in canonical form, to be satisfiable, there is an assignment of variables that ensures these disjunctive formulae are true. Each of the formulae in the canonical form is called a clause. As used herein, the term "clause" can also refer to a constraint.

Oftentimes in such complex domains such as CSP solvers, there is no analytic method by which even a partial solution may be derived. One must assume an answer—essentially a guess. Consequently, initial assumptions once deemed true by a program can change over time and later be discovered to be false. Accordingly, the program has the problem of undoing inferences it might have made, based on assumptions later found to be false. To be efficient, the process attempts to undo as little as possible.

A SAT confronts the problem just described because in order to demonstrate satisfiability, a partial assignment of answers is guessed. The guess causes other Boolean variable answers to be assigned because of the logical consequences of the new guess. The result of such a guess is that either a successful set of guesses is eventually made which cause all the variables to become assigned, or the last guess made leads to a logical inconsistency, at which point one of the guesses is given up.

Conventionally, chronological backtracking can be employed to move backward, choosing values for one variable at a time. This backtracking may continue until a variable has no legal values left to assign.

The disclosed innovation employs "non-chronological" backtracking by providing the capability to undo the most relevant assumptions, for example, change only that one assumption, and change nothing to the intermediate assumptions. In other words, the algorithm can go back in the arbitrary path, pick one assumption, and change only that assumption, in contrast to conventional systems where backing up changes all nodes between the current position and some earlier position.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof Referring initially to the drawings, FIG. 1 illustrates a system 100 that facilitates solver processing in accordance with a parallel implementation. The system 100 includes a bookkeeping component 102 for representing solver state 104 (denoted SOLVER STATE$_1$, SOLVER STATE$_2$, . . . , SOLVER STATE$_N$, where N is a positive integer) associated with processing of a computational thread parallel solvers as a set of support graphs. The solver state 104 can be received from different systems in a parallel fashion for processing by the bookkeeping component 102. The bookkeeping component 102 processes the solver state 104 into support graphs for subsequent merging. The system 100 can also include a merge component 106 for pairwise merging of at least two input support graphs of the set of support graphs into a merged graph that represents the final state of the computation thread.

Manipulation of the support graphs by the bookkeeping and merge components (102 and 106) can be simultaneous. In other words, solver state from one of the solvers is received and processed during the processing of solver state from another solver.

In one implementation, the bookkeeping component 102 receives the input solver state 104 from parallel CSP solvers operating on the computation thread. As described in more detail infra, a CSP solver is defined according to a lattice of valuations A and a set of values D, where D and A are the same set. In a more specific alternative implementation, the bookkeeping component 102 receives the input solver state 104 from parallel Boolean SAT solvers operating on the computation thread.

Where the input solver state 104 is from two parallel SAT solvers operating on the computational thread, the merge component 102 facilitates adding n new and distinct literals to each of n copies of an L-complete, K-consistent deduction graph, where n is a positive integer. This will also be described further hereinbelow.

The merge component 106 merges the input solver state into the merged graph in a lock-free manner, without cycles, and eliminates conflicts in the merged graph, thereby outputting a conflict-free graph 108.

With respect to lock-free processing, one way of achieving parallelism is to have the capability of handling parallel thread processing. In other words, there exist a number of parallel threads which eventually require results finalization.

One conventional way of performing parallel thread handling is that a first thread simply locks the other threads out of some shared data structure until the first thread has reached a result. It then becomes incumbent upon the other threads obtain results that are consistent with previous thread results.

The subject innovation avoids conventional locking by processing one-step ahead, in parallel, and then combining the results. Accordingly, this method is lock-free, in that, since there are m independent agents, where m is a positive integer, each agent has taken a step ahead, and in order to get the overall answer, the agents must combine the results. At the heart of the process, results are combined two at a time.

When merging support graphs, there are several undesirable things that can happen. First, a conflict occurs between the two graphs. In other words, a variable x has been assigned a true value in a first graph and the same variable x in the other graph has the assignment false. Solving, the two graphs are merged and a set of assumptions is found that leads to this conflict. Once found, the associated assumption or one of the assumptions, is withdrawn.

A second problem can occur when as assignment in one graph is an assumption and the same assignment in another graph is derived by unit resolution. If graph merger is now attempted, the resulting graph would exhibit a cycle. To resolve, assumptions are given up in a very economical way using a greedy method. This is described in greater detail infra.

Figure 2:
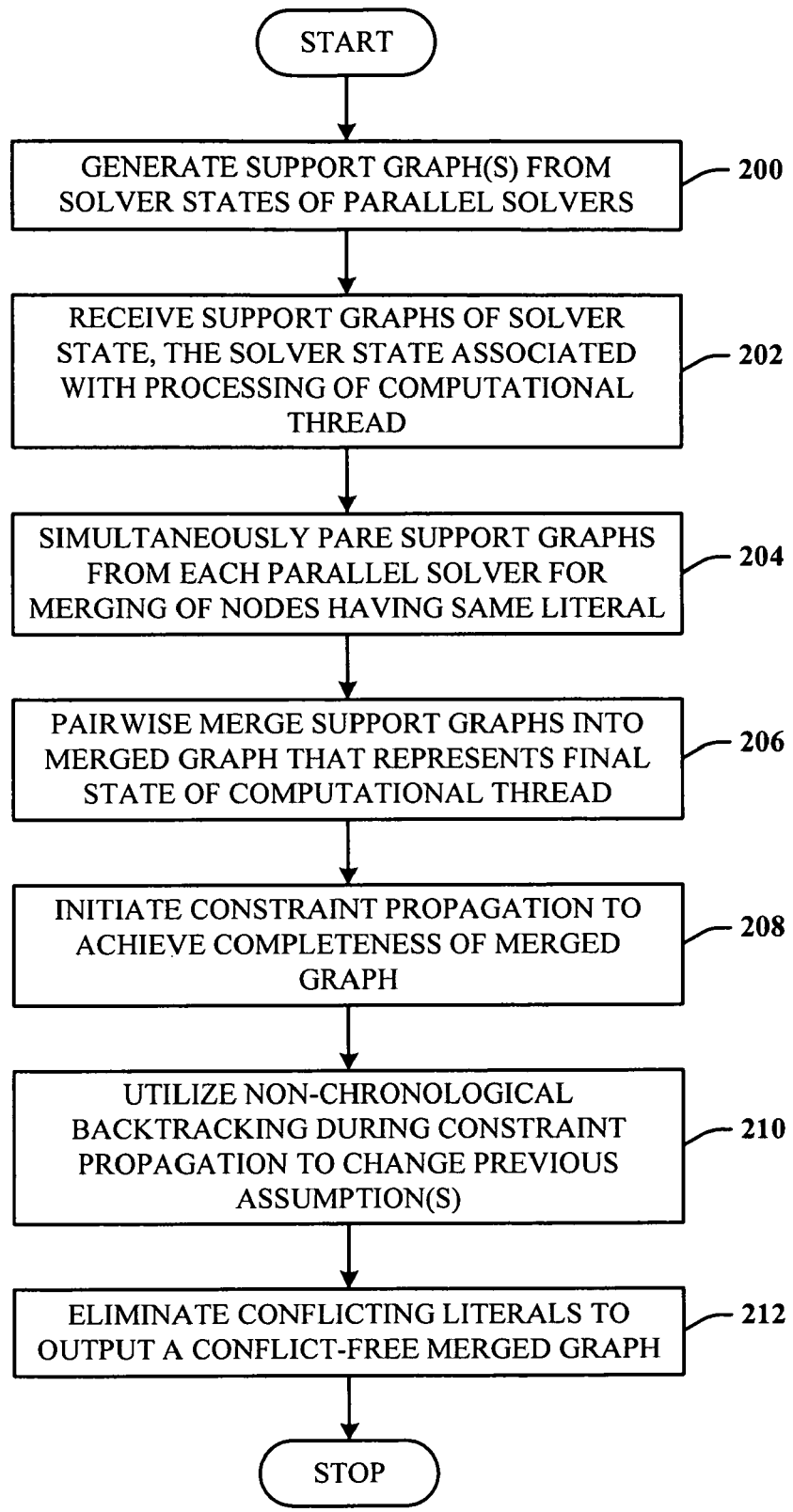
FIG. 2 illustrates a methodology of processing solver state in accordance with the innovation.

FIG. 2 illustrates a methodology of processing solver state in accordance with the innovation. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, support graphs are generated from the solver states of parallel solvers. At 202, the support graphs of solver state are received, the solver state associated with processing of a computational thread. At 204, the support graphs from each solver are pared down simultaneously for merging of nodes having the same literals. At 206, the support graphs are pairwise merged into a merged support graph that represents the final state of the computational thread. At 208, constraint propagation is initiated to achieve completeness of the merged graph. At 210, non-chronological backtracking is utilized during constraint propagation to change previous assumptions and resolve conflicts. At 212, conflicting literals are eliminated to output a conflict-free merged graph.

Figure 3:
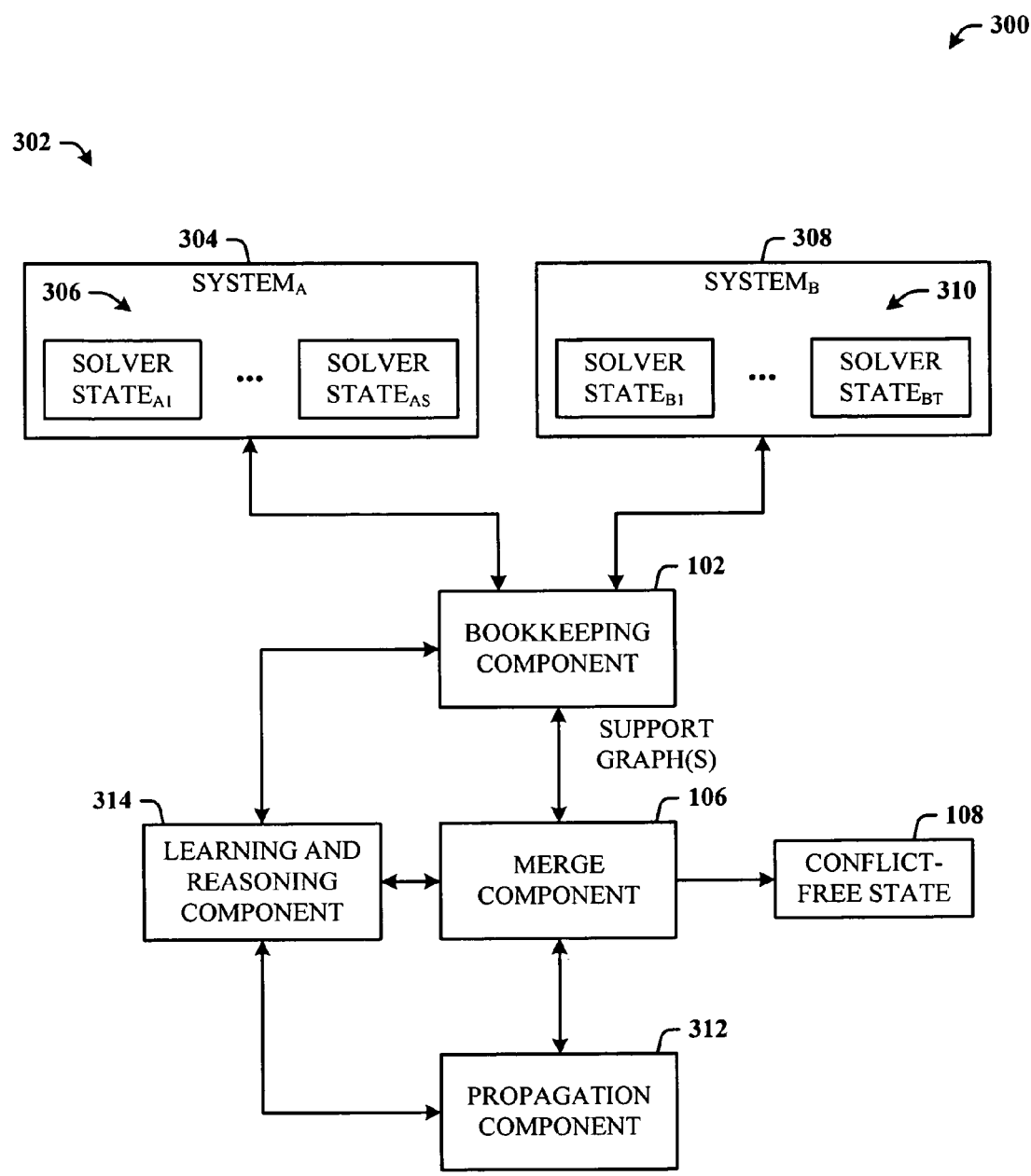
FIG. 3 illustrates an alternative parallel solver system that employs learning and reasoning to infer guesses for answer assignments.

Referring now to FIG. 3, there is illustrated an alternative parallel solver system 300 that employs learning and reasoning to infer guesses for assignment of answers. The system 300 includes multiple systems (e.g., two sequential solver systems) 302 that generate solver state. For example, a first system 304 (denoted SYSTEM$_A$), a first sequential CSP solver, for example, generates solver state 306 (denoted SOLVER STATE$_{A1}$, . . . , SOLVER STATE$_{AS}$, where S is a positive integer), and a second system 308 (denoted SYSTEM$_B$), a second sequential CSP solver, for example, generates solver state 308 (denoted SOLVER STATE$_{B1}$, . . . , SOLVER STATE$_{BT}$, where T is a positive integer).

The bookkeeping component 102 receives the solver state (306 and 310) from the corresponding first and second systems (304 and 308) and creates graphs (e.g., support graphs) of the solver state for parallel thread processing and that accounts for system constraints. The graphs are passed to the merge component 106 for merging into a merged graph having conflict-free state 108. However, the merged graph may not be complete. Accordingly, constraint propagation facilitated by a propagation component 312 is utilized to ensure completeness in the merged graph. This is described in greater detail hereinbelow. The propagation component 312 also facilitates non-chronological backtracking as part of the constraint propagation to directly change an earlier assumption without changing an intermediate assumption.

The system 300 can also employ a learning and reasoning component 314 (also referred to herein as an inference engine) that facilitates making inferences about variable assignments based on guesses during constraint propagation.

The system 300 can operate in applications where not all of the answers are known. Accordingly, assumptions are made about what is going in the world. For example, as a server program is exposed to more data, it can occur that earlier assumptions that the program made will be discovered to be false. The program then has the problem of undoing inferences that might have made based on false premises.

In the satisfiability problem, a similar problem can exist because in order to demonstrate satisfiability, an assignment of answers may have to be guessed. In other words, in the sequential case when a new guess is made, this causes other Boolean variable answers to be assigned because of the logical consequences of the new guess. Moreover, one of two things eventually happens. Either a successful set of guesses is made, which cause all the variables to become assigned, or the last guess made leads to a logical inconsistency, at which point one of the guesses is given up.

In the most classical version of Boolean satisfiability, the sign of the last guess is changed so if previously the Boolean variable was assigned false, the assignment is changed to true and the process proceeds again. It is possible that a logical inconsistency occurs when an assignment can be neither true nor false, which means that some earlier assignment made must have been wrong.

Rather than backing up and moving forward repeatedly, as necessary, the actual set of assumptions that lead to the observed conflict is identified. Once a conflict has been observed, it is desired to diagnose exactly what leads to the conflict, which may or may not be the last assumption made. Such a diagnosis can be precisely made and consequently a set of incompatible assumptions identified.

The subject architecture (e.g., in connection with selection) can employ various learning and reasoning based schemes for carrying out various aspects thereof. For example, a process for determining which assignment to toggle (e.g., from true to false or from false to true) can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=\text{confidence}(\text{class}(x))$. Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In other words, the learning and reasoning component 314 can apply learned constraints for conflict processing. One example, as described below, one learned constraint can be added to a sequential SAT solver for conflict resolution. Similarly, in a parallel SAT solver, several learned constraints can be added during constraint propagation processing.

Prior to looking at a constraint propagation example, preliminary information is provided for a better understanding. A constraint satisfaction problem (CSP) is typically described as follows: given a finite set of variables V, a (typically finite) set of values D, a (possibly infinite) lattice of valuations A and a finite set of functions (constraints) $D^{|V|} \to A$, find a tuple in $D^{|V|}$ such that the lattice meet among that tuple's images in all the constraints is maximal in A. Following is a description where D and A are both the lattice of Booleans, specifically describing the invention in the context of a SAT solver. This restriction not with standing, the invention is generalizable to any CSP where D and A are the same set.

Variable are denoted $x_1, x_2, \ldots, x_n$, where n is a positive integer. Literals are "signed" variables: $x_1, \neg x_1, x_2, \neg x_2, \ldots$ L is the set of literals with l ranging over L. A clause in a finite set of literals including the empty clause, denoted □. A clause $\{x_1, \neg x_2, x_3, \neg x_4\}$ is often written instead as $x_1 \vee \neg x_2 \vee x_3 \vee \neg x_4$ (the logical OR ($\vee$) of its elements). Any finite set of propositional formulae can be rendered as a logically equivalent finite set of clauses.

A variable can be unassigned, or assigned a value of True (e.g., $x_1$) or False (e.g., $\neg x_1$). An assignment of the value True to the variable x is conflated with the literal x. An assignment of the value False to the variable x is conflated with the literal $\neg x$. Valuations are attributed to clauses as a result of lifting assignments from variables to clauses. A clause with an assignment of True is satisfied, and a clause with an assignment of False is violated. Satisfiability is the question of whether there is an assignment of logical variables that satisfies a set of causes. Tautology is the question of whether a set of clauses is satisfied by every assignment. Satisfiability and tautology are dual concepts in that a formula is a tautology if and only if its negation is unsatisfiable.

Let K be a set of clauses over the literals in L. An (L,K)-deduction graph is a directed graph whose nodes are labeled with individual literals paired with subsets of L and whose edges are labeled with members of K. When there is no confusion about which L and K are meant, the graph is referred to simply as a deduction graph. A node is a k-antecedent to another just in case there is a directed edge from the first to the second where the edge is labeled with the clause k.

An (L,K) deduction graph is well-labeled just in case the label on a node is the union of the labels on its antecedent nodes, if the node l has no incoming arcs then it is labeled with {l}, all incoming edges to the node for literal l are labeled with a clause of the form l ∨ k, all outgoing edges from the node for the literal l are labeled with a clause of the form $\neg l \vee k$. Whenever there is an edge labeled $l \vee l_1 \vee \ldots \vee l_m$ incident upon the l node, there are m−1 other edges labeled $l \vee l_1 \vee \ldots \vee l_m$ that are also incident upon the l node.

A node l in an (L,K)-deduction graph labeled with a singleton set consisting of itself (e.g., $\neg x_9 @ \{\neg x_9\}$) is called an assumption literal. A well-labeled (L,K)-deduction graph is uniquely justified if the incoming arcs incident upon a node are labeled with exactly one clause. A well-labeled (L,K)-deduction graph is K-consistent just in case it does not contain both the nodes l and $\neg l$. A well-labeled (L,K)-deduction graph is K-complete just in case for every k in K of the form $l \vee l_1 \vee \ldots \vee l_m$, whenever $\neg l_1, \ldots, \neg l_m$ are in the graph, l is in the graph with input incident edges labeled with k. An acyclic well-labeled (L,K)-deduction graph, G, is L-complete if there is no larger (in terms of nodes) well-labeled graph, G'.

Figure 4:
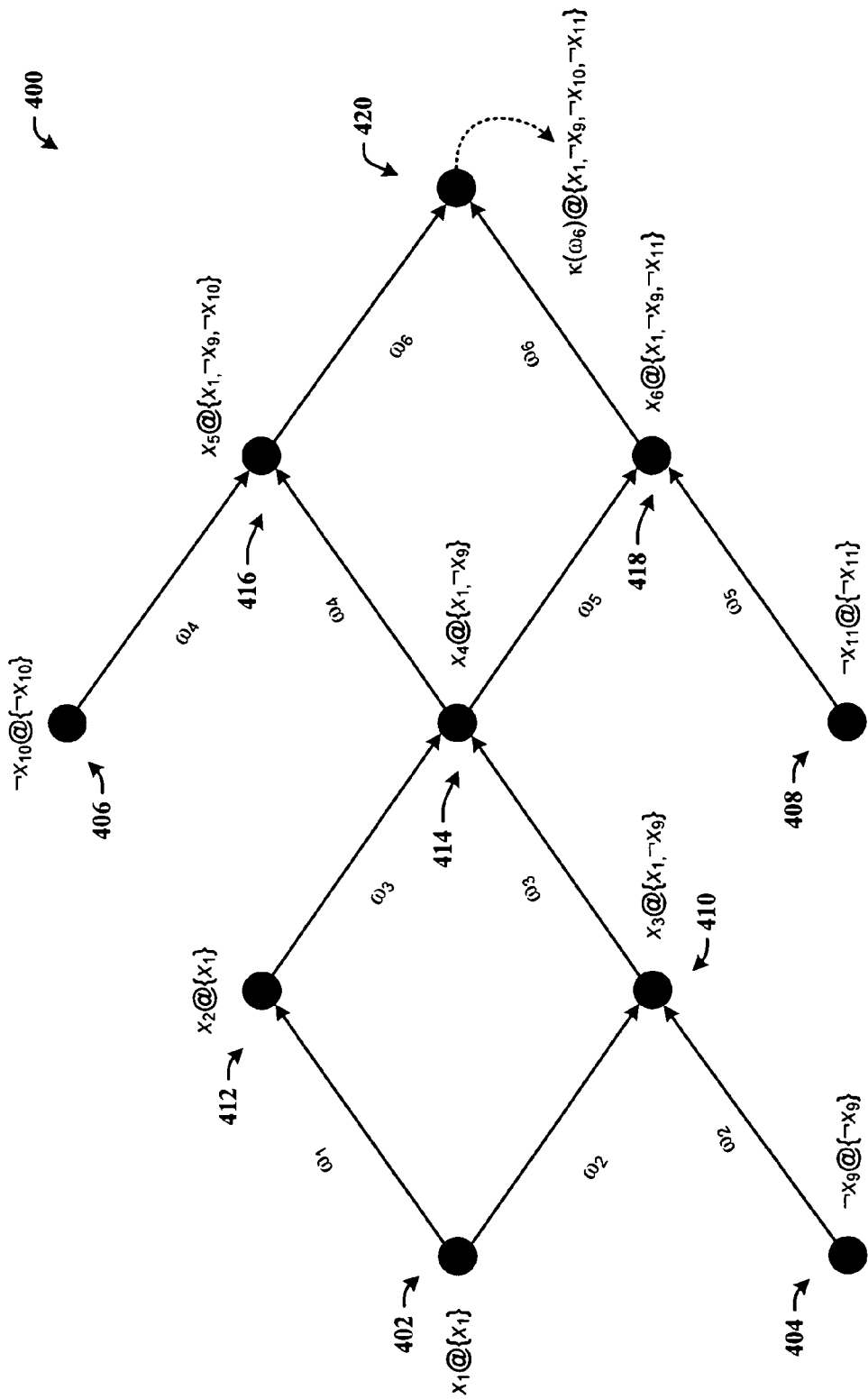
FIG. 4 illustrates an (L,K)-deduction graph derived from an exemplary constraint propagation process.
Figure 5:
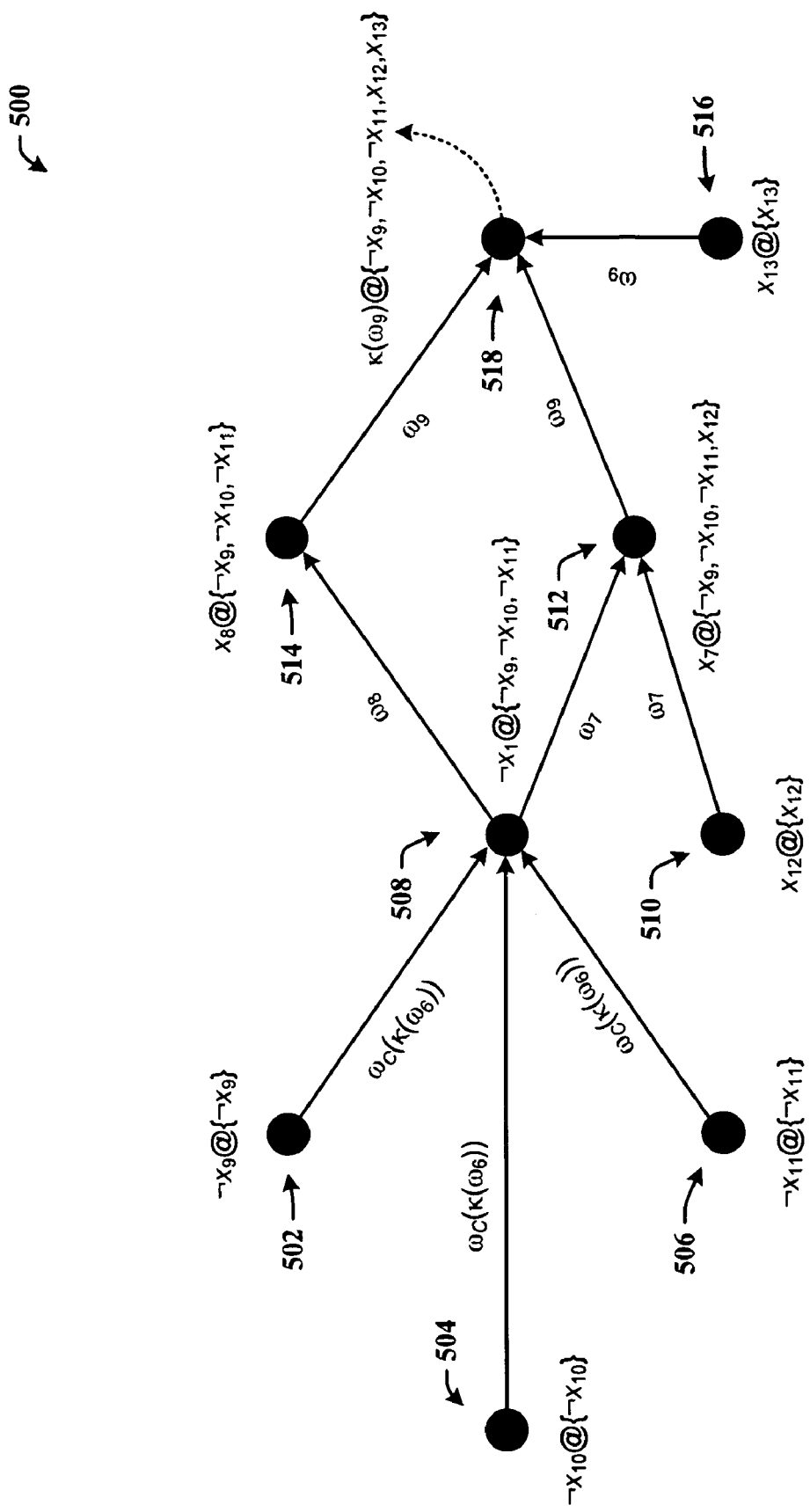
FIG. 5 illustrates a new graph for processing the conflicting constraint output from the support graph of FIG. 4.

FIG. 4 and FIG. 5 illustrate a parallelized solver example that employs support graphs for conflict processing. FIG. 4 illustrates an (L,K)-deduction graph 400 derived from an exemplary constraint propagation process. To illustrate application of the above definitions, consider an example of a satisfiability problem and an attempted partial solution. Begin with an initial set of constraints C that include, $\omega_1 \equiv (\neg X_1 \vee X_2)$ $\omega_2 \equiv (\neg X_1 \vee X_3 \vee X_9)$ $\omega_3 \equiv (\neg X_2 \vee \neg X_3 \vee X_4)$ $\omega_4 \equiv (\neg X_4 \vee X_5 \vee X_{10})$ $\omega_5 \equiv (\neg X_4 \vee X_6 \vee X_{11})$ $\omega_6 \equiv (\neg X_5 \vee \neg X_6)$ $\omega_7 \equiv (X_1 \vee X_7 \vee \neg X_{12})$ $\omega_8 \equiv (X_1 \vee X_8)$ $\omega_9 \equiv (\neg X_7 \vee \neg X_8 \vee \neg X_{13})$ and a current stack of assumptions. In the deduction graph 400, assumptions are modeled as assumption nodes, which nodes have no input arc. Accordingly, the assumptions for the graph 400 include, $X_1 @ \{X_1\}$, $\neg X_9 @ \{\neg X_9\}$, $\neg X_{10} @ \{\neg X_{10}\}$, and $\neg X_{11} @ \{\neg X_{11}\}$.

The graph 400 includes four assumption nodes: a first assumption node 402 where $x_1$ has been assigned true (e.g., $x_1$); a second assumption node 404 where $x_9$ has been assigned false (e.g., $\neg x_9$); a third assumption node 406 where $x_{10}$ has been assigned false (e.g., $\neg x_{10}$); and, a fourth assumption node 408 where $x_{11}$ has been assigned false (e.g., $\neg x_{11}$).

Looking at a snapshot in time, the graph 400 indicates that assumption node 402 has an assignment of true to $x_1$ (e.g., $x_1$), and assumption node 404 has an assignment of false to $x_9$ (e.g., $\neg x_9$). Now consider the edges labeled $\omega_2$, the constraint clause $\omega_2 \equiv (\neg x_1 \vee x_3 \vee x_9)$, as listed above; in other words, it can be read as "not $x_1$ or $x_3$ or $x_9$." However, notice that in the constraint $\omega_2$, $x_1$ appears negatively as $\neg x_1$, which means that the assignment as true in the graph 400 makes the disjunct false, and $x_9$ as being assigned negatively, also makes $x_9$ disjunct false. But the overall constraint $\omega_2$ has to be made true, and the only remaining way that can get constraint clause $\omega_2$ to be true is when $x_3$ is assigned to be true (e.g., $x_3$). This is exactly what the graph 400 indicates at node 410, by assigning $x_1$ as true. Thus, based on the assumptions at the input nodes 402 and 404, and the associated constraint $\omega_2$, the only way to satisfy the constraint $\omega_2$ is to assign $x_3$ as true. This is an application of unit resolution.

Continuing with the other nodes, the edge to a node 412 uses the constraint $\omega_1 \equiv (\neg x_1 \vee x_2)$. However, $x_1$ at the node 402 is assigned true, leaving the only remaining possibility in satisfying the constraint $\omega_1$ is to assign $x_2$ at node 412 as true. Looking at the edges labeled $\omega_3$, the constraint clause $\omega_3 \equiv (\neg x_2 \vee \neg x_3 \vee x_4)$ can only be satisfied by assigning true to $x_4$ at node 414. In other words, the input nodes to 414 are 410 and 412, which assign true to $x_3$ and $x_2$, respectively, leaving the only remaining possible way to satisfy $\omega_3$ is to assign true to $x_4$.

Looking at the edges labeled with $\omega_4$, the constraint clause $\omega_4 \equiv (\neg x_4 \vee x_5 \vee x_{10})$ can only be satisfied by assigning true to $x_5$ at node 416, since the input $x_{10}$ is assigned false and the input $x_4$ is assigned true. The edges labeled $\omega_5$ use the constraint clause $\omega_5 \equiv (\neg x_4 \vee x_6 \vee x_{11})$, which can only be satisfied by assigning true to $x_6$ at node 418, since the inputs x11 is assigned false and the input $x_4$ is assigned true. Finally, the edges labeled $\omega_6$ use the constraint clause $\omega_6 \equiv (\neg x_5 \vee \neg x_6)$, which constraint fails based on the existing assignments of $x_5$ true and $x_6$ true at the corresponding nodes 416 and 418.

Constraint propagation leads to the (L,K)-deduction graph 400 and, when reaching a last node 420, outputs a newly-derived constraint (written in a different form), $\omega_C(\kappa(\omega_6)) \equiv \neg(x_1 \wedge \neg x_9 \wedge \neg x_{10} \wedge \neg x_{11})$, where κ (kappa) represents "conflict" and the constraint is a report of what went wrong. Here, the output $\omega_C(\kappa(\omega_6))$ indicates that it cannot be that simultaneously, $x_1$ is true, $x_9$ is false, $x_{10}$ is false, and $x_{11}$ is false, one of which has to be given up for further processing. This is equivalent to not $x_1$ or $x_9$ or $x_{10}$ or $x_{11}$, which is in correct form. FIG. 5 illustrates a new graph 500 for processing the conflicting constraint output from the support graph of FIG. 4. Selecting assumptions for three of four of the above (e.g., $\neg x_9$, $\neg x_{10}$, and $\neg x_{11}$) yields the new graph 500 and yet another newly-derived output constraint $\omega_C(\kappa(\omega_9)) \equiv \neg(\neg x_9 \wedge \neg x_{10} \wedge \neg x_{11} \wedge x_{12} \wedge x_{13})$.

More specifically, the graph 500 is created by making assumptions (dropping one of the early assumptions), using assumption nodes 502, 504, and 506 as $\neg x_9 @ \{\neg x_9\}$, $\neg x_{10} @ \{\neg x_{10}\}$, and $\neg x_{11} @ \{\neg x_{11}\}$, respectively. Beginning with these assumptions and applying the newly-derived constraint $\omega_C(\kappa((\omega_6))$ to the edges yields an assignment of false to $x_1$ at node 508 to satisfy the constraint $\omega_C(\kappa(\omega_6))$.

Looking at the edges labeled $\omega_7$, another assumption node 510 (assigned $x_{12} @ \{x_{12}\}$) is introduced, and the constraint clause $\omega_7 \equiv (x_1 \vee x_7 \vee \neg x_{12})$ can only be satisfied by assigning true to $x_7$ at node 512, since the input $x_1$ is assigned false and the input $x_{12}$ is assigned true.

Looking at the edge labeled $\omega_8$, the constraint clause $\omega_8 \equiv (x_1 \vee x_8)$ can only be satisfied by assigning true to $x_8$ at node 514, since the input $x_1$ is assigned false. Now considering the edges labeled $\omega_9$, the constraint clause $\omega_9 \equiv (\neg x_7 \vee \neg x_8 \vee \neg x_{13})$ cannot be satisfied using the current inputs (node 512, node 514, and an assumption node 516). Thus, the newly-derived constraint $\omega_C(\kappa(\omega_9)) \equiv \neg(\neg x_9 \wedge \neg x_{10} \wedge \neg x_{11} \wedge x_{12} \wedge x_{13})$, output at node 518, is a report of what went wrong with the deduction graph 500. The constraint derivation process continues until no conflict states exist.

Described in a more general way, once support graphs are obtained for the solver states of each parallel solver thread, merging can be commenced. Although the description focuses on pairwise merging, it is within contemplation that merging can be accomplished using more than two graphs. State merging is lock-free. In other words, one conventional way of achieving parallelism involves threads processing. For example, where a multiplicity of parallel threads is processing data, eventually it is desired to merge the results of the threads. One way of doing this is by a first thread simply locking the other threads out from some shared data structure until the first thread completes its process. Accordingly, it is incumbent upon the other locked-out threads to write results that are consistent with those that have already been written. This conventional architecture is at least inefficient. The disclosed architecture avoids such explicit locking mechanism.

As described supra, the algorithm(s) perform processing one step ahead in parallel and then the results are combined. In other words, in order to arrive at the overall result, each agent processes ahead one step and the separate interim results are combined, and this continues until reaching the overall answer. Additionally, conflict processing is resolved and the merge process is cycle free.

As before, in deconflict processing, one or more assumptions may be given up in one or the other of the graphs. Moreover, it is desirable to be very economical about what assumptions to give up. By defining all of the sets of information (e.g., assumptions, deductions, graphs, . . . ) used by the disclosed architecture, a reduction algorithm (also referred to herein as redux) makes choices in a way that it gives up as little as possible between the two graphs being merged. Recall that in a single graph case, the point of identifying these conflicts is to identify an assumption that has as little a consequence as possible if it were to be given up, rather than having to backup over several previous assumptions, which a point for the set of support graphs.

Now applying the same technique(s) to a pair of graphs, the graphs are merged in a cycle-free fashion such that if an assumption is given up, as little as possible is affected or lost. This can be addressed by utilizing a "greedy" method or algorithm. In other words, the method finds a cheap way of minimizing what is being given up by making the choice that seems to be the best at the particular point in time. More intensive algorithms can be employed that utilize much more analysis; however, in one implementation, the greedy method is sufficient.

Figure 6:
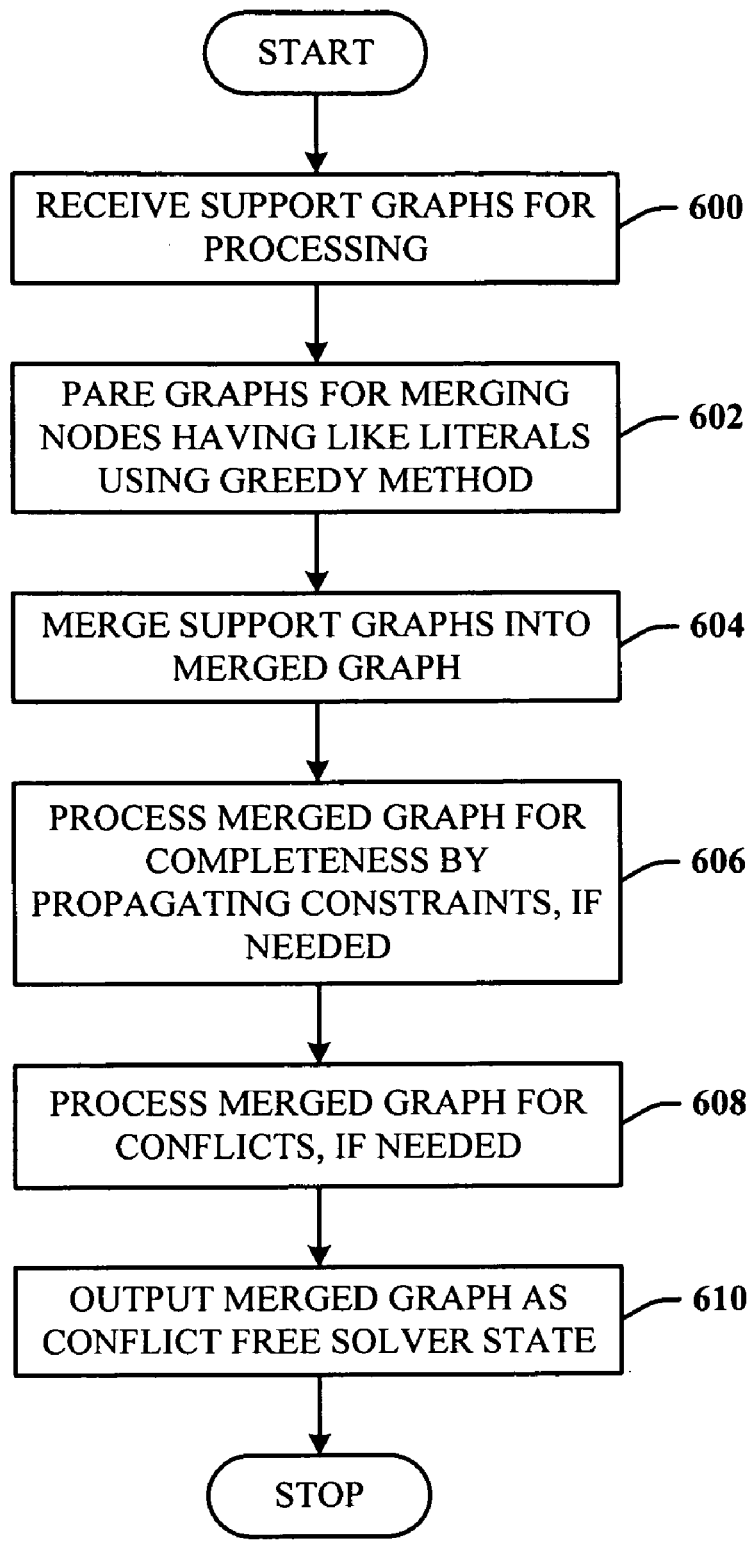
FIG. 6 illustrates a method of preparing and merging two support graphs.

FIG. 6 illustrates a method of preparing and merging two support graphs. At 600, two support graphs are received for processing. At 602, the graphs are pared (or reduced) down for merging nodes that correspond to the same literals to reduce or eliminate cycling using a greedy method. At 604, merge the support graphs into a merged graph. At 606, process the merged graph for completeness by propagating constraints, if needed. At 608, process merged graph for conflicts, if needed. At 610, the final merged graph is output that represents conflict-free solver state.

In preparation for a more detailed description of how two (L,K)-deduction graphs can be merged, the following definitions are presented. If G, G' are acyclic, L-complete (L,K)-deduction graphs, then $C_{G,G'}$ is the set of assumptions in common to the graphs G and G'.

$A_G$ is the set of assumptions of G.

$D_G$ is the set of deductions of G.

$A_{G,G'}$ is the set of assumptions of G that are deductions of G'.

$B_{G,G'}$ is the set of assumptions of G that are not mentioned in G'

$$A_G = C_{G,G'} \cup A_{G,G'} \cup B_{G,G'}$$

$$A_G = C_{G,G'} \cup A_{G',G} \cup B_{G',G}$$

$f_G: A_G \to 2^{L-A_G} - f_G$ being a function that produces the dependents of an assumption in G.

$h_G: L-A_G \to 2^{A_G} - h_G$ being a function that produces the antecedents of a deduction in G.

Figure 7:
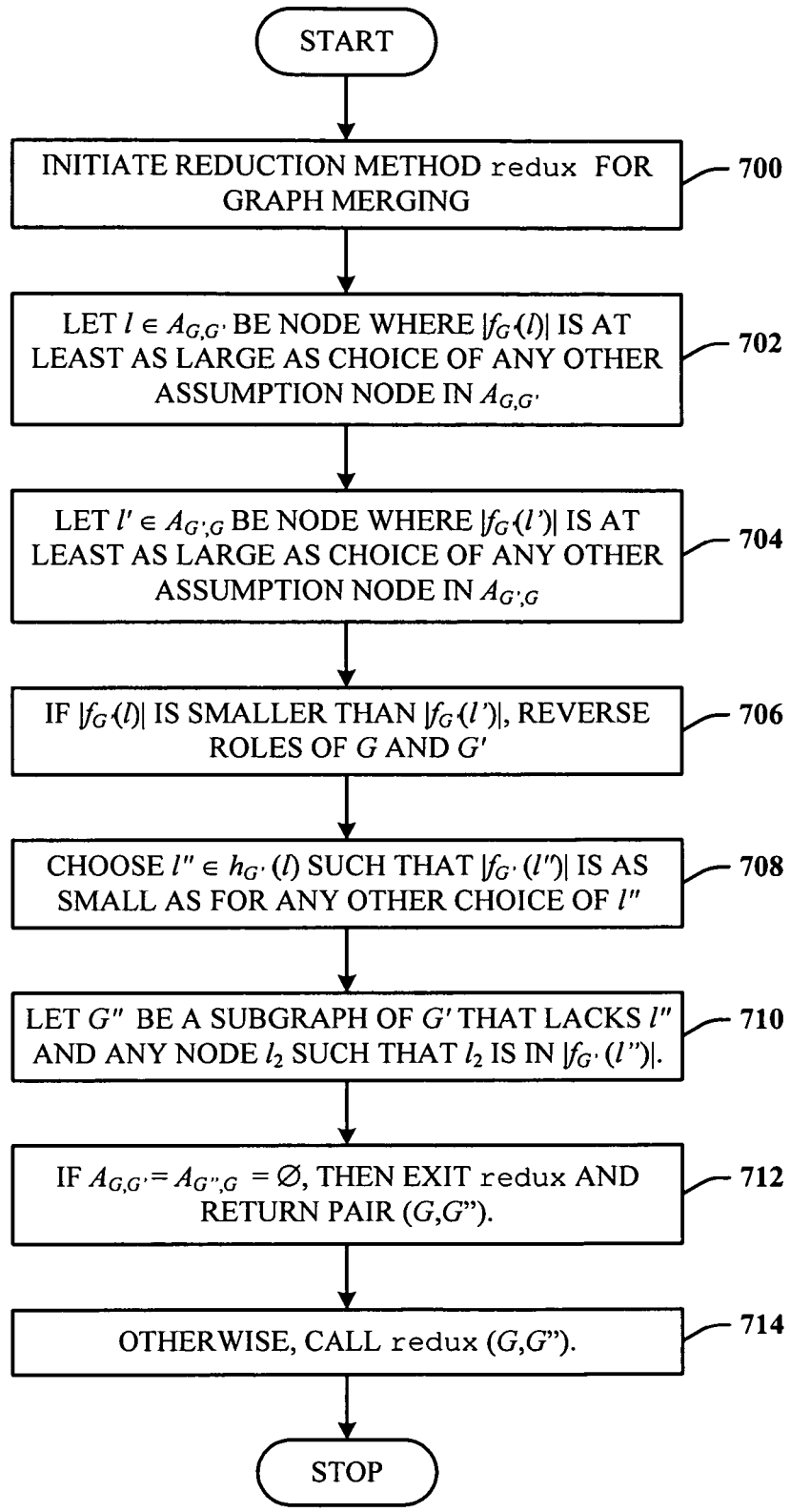
FIG. 7 illustrates a method of paring down two input support graphs for a pairwise merging process.

FIG. 7 illustrates a method of paring down two input support graphs for a pairwise merging process. At 700, in this particular implementation, this process is initiated according to a function called redux. The function redux (G,G") produces a pair of graphs $(G_1, G_2)$ defined as follows. At 702, a first definition is provided: Let $l \in A_{G,G'}$ be a node such that $|f_G(l)|$ (the size of the set of dependents) is at least as large as the choice of any other assumption node in $A_{G,G''}$. At 704, a second definition is provided: Let $l' \in A_{G',G}$ be a node such that $|f_G(l')|$ is at least as large as the choice of any other assumption node in $A_{G',G}$. At 706, if $|f_G(l)|$ is smaller than $|f_G(l')|$, the roles of G and G' are reversed. At 708, $l'' \in h_G(l)$ is chosen such that $|f_G(l'')|$ is as small as any other choice of l''. At 710, define G" be the subgraph of G' that lacks l" and any node $l_2$ such that $l_2$ is in $|f_G(l'')|$. At 712, if $A_{G,G'} = A_{G'',G} = \emptyset$, then exit redux, returning the pair (G,G"). At 714, if not $A_{G,G'} = A_{G'',G} = \emptyset$, then call redux (G,G").

Eventually, redux pares the two graphs down so that the nodes corresponding to the same literals can be merged without fear of cycles. As indicated infra, redux pares in a "greedy" fashion, in the sense that it attempts to give up as few derived (non-assumption literals) as possible. It is desirable to pare in a way such that in the end, as much parallel forward progress as possible is achieved. However, it is to be understood that other algorithms can be employed that pare back the graphs for merging without fear of cycles.

Figure 8:
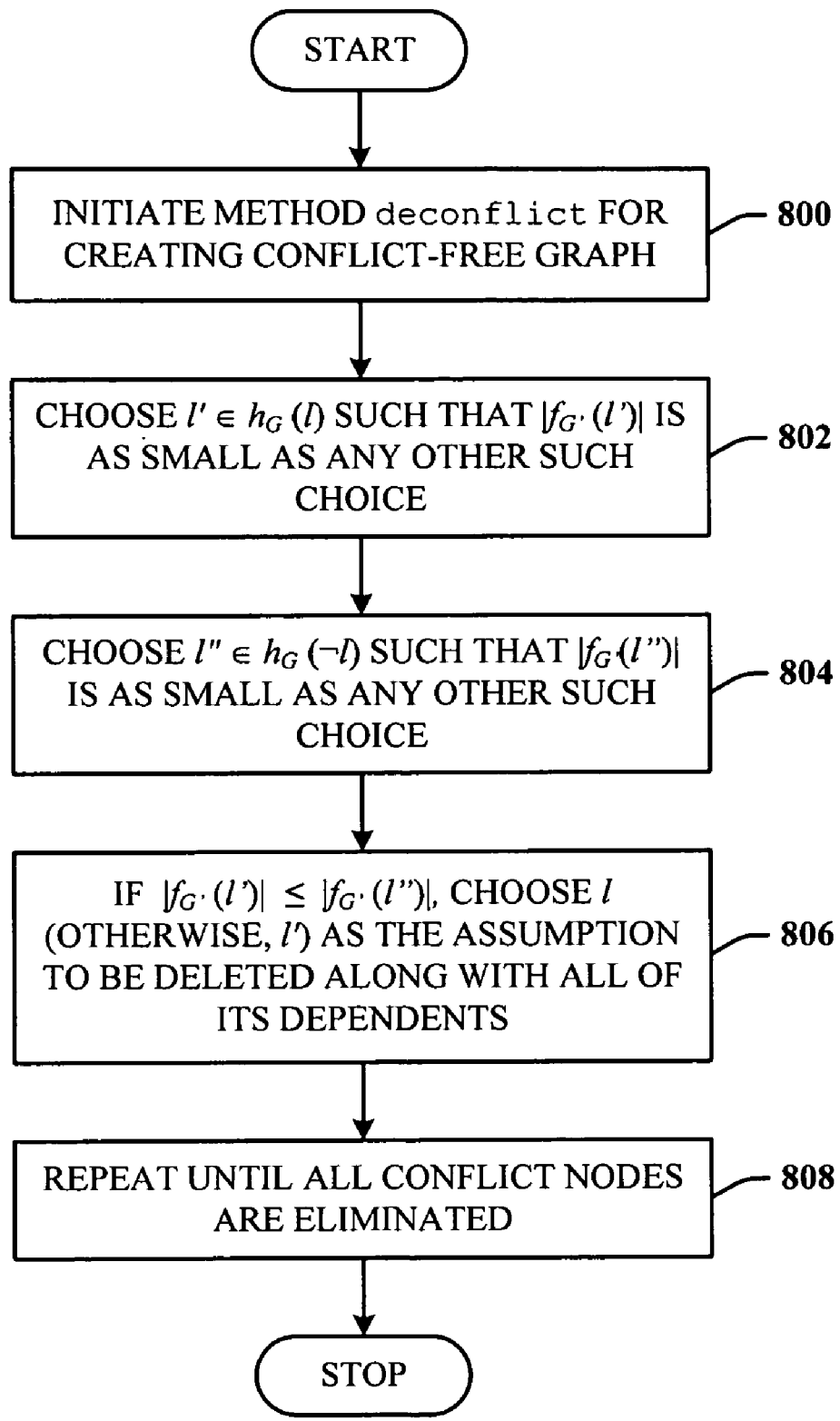
FIG. 8 illustrates a method of processing conflicts of a merged graph.

Note that the merged graph—call it G, again—is no longer L-complete, which can be remedied by propagating constraints to make it so. It is also possible that the merged graph contains conflicting literals l and ¬l, in which case, deconflict (G) is computed for this graph, which produces a conflict-free graph. FIG. 8 illustrates a method of processing conflicts of a merged graph. At 800, in this particular implementation, removing conflicts is initiated according to a function called deconflict. At 802, choose $l' \in h_G(l)$ such that $|f_G(l')|$ is as small as any other such choice. At 804, choose $l'' \in h_G(\neg l)$ such that $|f_G(l'')|$ is as small as any other such choice. At 806, if $|f_G(l')| \leq |f_G(l'')|$, choose l (otherwise, l') as the assumption to be deleted, along with all of its dependents. At 808, this process is repeated until all conflicting nodes are eliminated.

Figure 9:
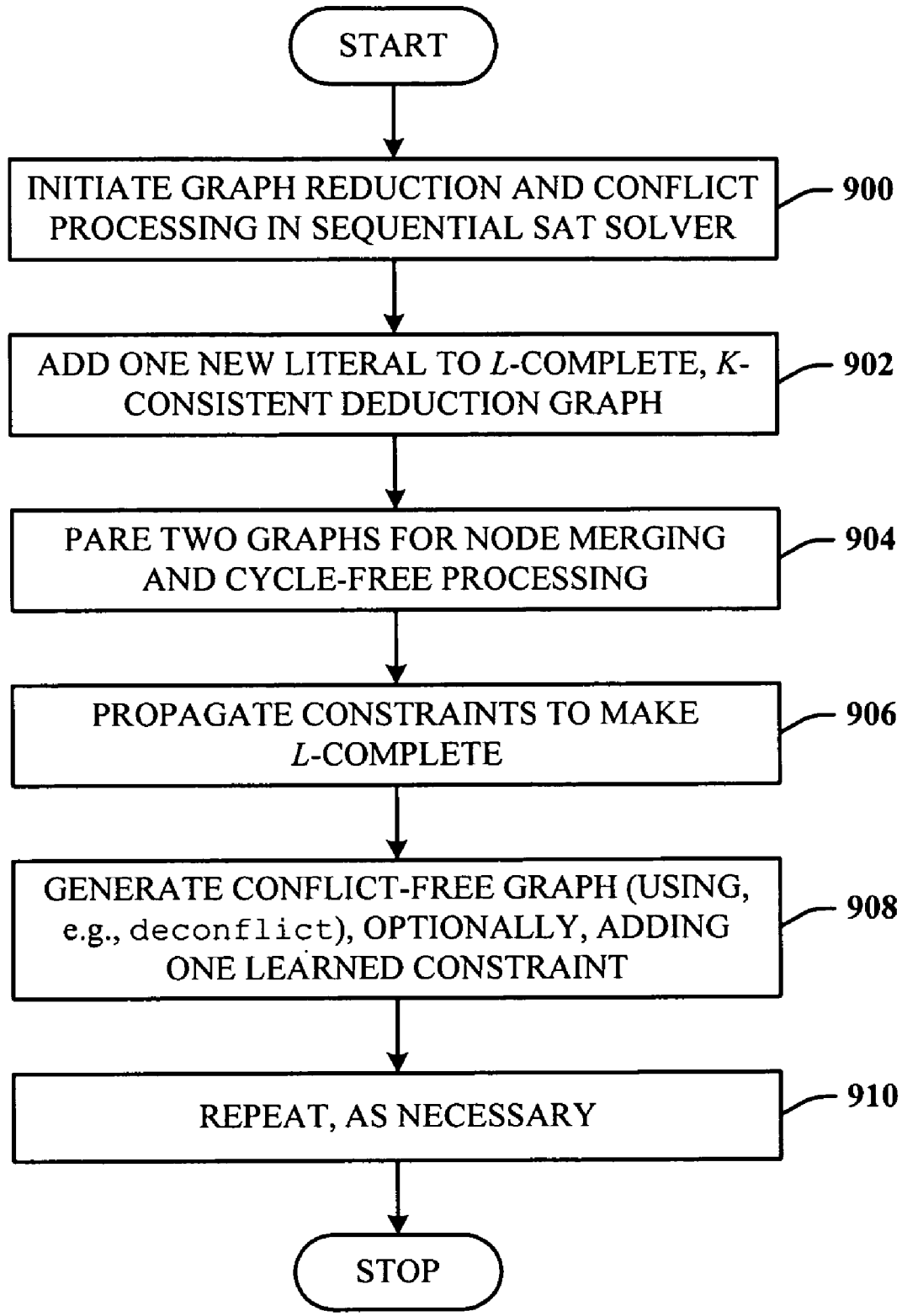
FIG. 9 illustrates a method of paring and merging support graphs into a final merged conflict-free graph for a sequential SAT solver.

The redux and deconflict functions can be employed in a SAT solver by positing a merge function, which first applies redux to a pair of graphs, and then applies deconflict to the result. FIG. 9 illustrates a method of paring and merging support graphs into a final merged conflict-free graph for a sequential SAT solver. At 900, graph paring (e.g., using redux) and conflict processing (e.g., using deconflict) are initiated in a sequential SAT solver. At 902, an inner loop of the sequential SAT solver adds one new literal to an L-complete, K-consistent deduction graph. At 904, the support graphs are pared to merge nodes and produce cycle-free processing. At 906, constraints are propagated to make the merged graph L-complete. At 908, a conflict-free merged graph (using, e.g., function deconflict) is provided by, optionally, adding one learned constraint. At 910, the process is repeated, as necessary, to output a merged conflict-free graph of solver state.

Figure 10:
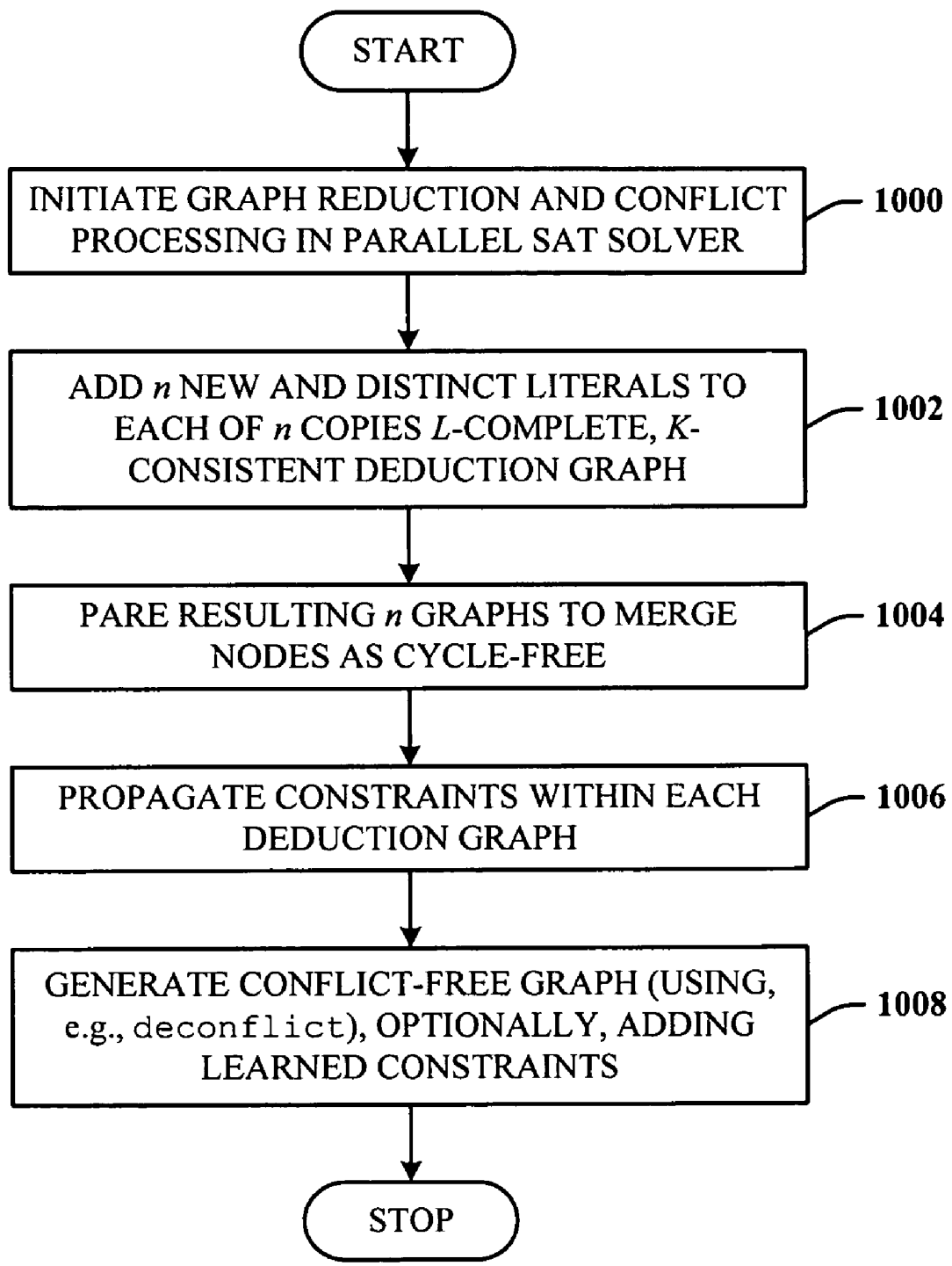
FIG. 10 illustrates a method of paring and merging support graphs into a final merged conflict-free graph for a parallel SAT solver.

FIG. 10 illustrates a method of paring and merging support graphs into a final merged conflict-free graph for a parallel SAT solver. At 1000, graph paring (e.g., using redux) and conflict processing (e.g., using deconflict) are initiated in a parallel SAT solver. At 1002, an inner loop of the parallel SAT solver adds n new and distinct literals to each of n copies of an L-complete, K-consistent support graph. At 1004, the n graphs are pared to merge nodes and produce cycle-free processing. At 1006, constraints are propagated within each deduction graph to make the merged graph L-complete. At 1008, a conflict-free merged graph (using, e.g., function deconflict) is output by, optionally, adding learned constraints.

Figure 11:
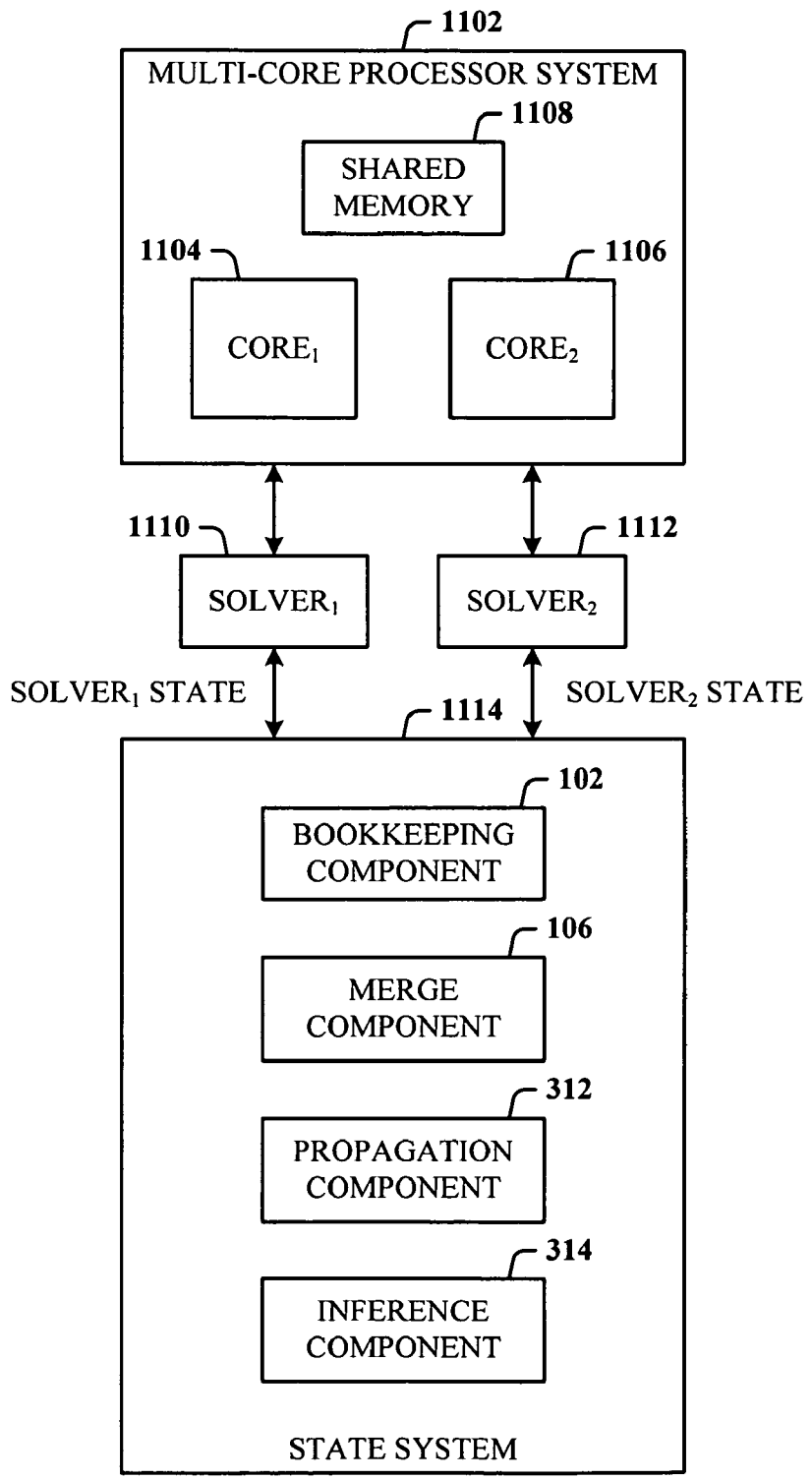
FIG. 11 illustrates a diagram of a system that applies solver state processing of the subject innovation to a multi-core processing system.

FIG. 11 illustrates a diagram of a system 1100 that applies solver state processing of the subject innovation to a multi-core processing system 1102. Multi-core processing system 1102 is a shared memory parallel processing system, as can be facilitated by a first processing core 1104 (denoted $CORE_1$) and a second processing core 1106 (denoted $CORE_2$), both fabricated on the same die. The processing system 1002 can also include onboard memory 1108 for shared buffering of a computational thread that is being processed. Although illustrated on the same die, the memory 1108 can be located external to the die and serve the same purpose.

In support of shared thread processing by each of the cores (1104 and 1106), a pair of solvers is provided. For example, a first solver 1110 (denoted $SOLVER_1$) and a second solver 1112 (denoted $SOLVER_2$), both of which can be CSP solvers, for example, are provided to perform constraint processing during thread execution among multiple cores (1104 and 1106) of the processor system 1102.

A state system 1114 is provided for pairwise support graph processing in accordance with the disclosed innovation. The state system 1114 provides pairwise processing of solver state (denoted as $SOLVER_1$ STATE and $SOLVER_2$ STATE)

received from the associated parallelized solvers (1110 and 1112) in the form of support graphs. The state system 1114 can include the bookkeeping component 102, merge component 106, propagation component 312 and inference component 314 described supra for accomplishing the support graph reduction (or paring), support graph merging, conflicts processing, and variable assignments.

It is to be understood that the state system 1114 can be implemented strictly in software, strictly in hardware (e.g., as an ASIC-application specific integrated circuit device or a field programmable gate array (FPGA)), or as a combination of both hardware and software. Alternatively, the components (102, 106, 312 and 314) of the state system 1114 can be implemented separately as combinations of hardware and/or software.

Figure 12:
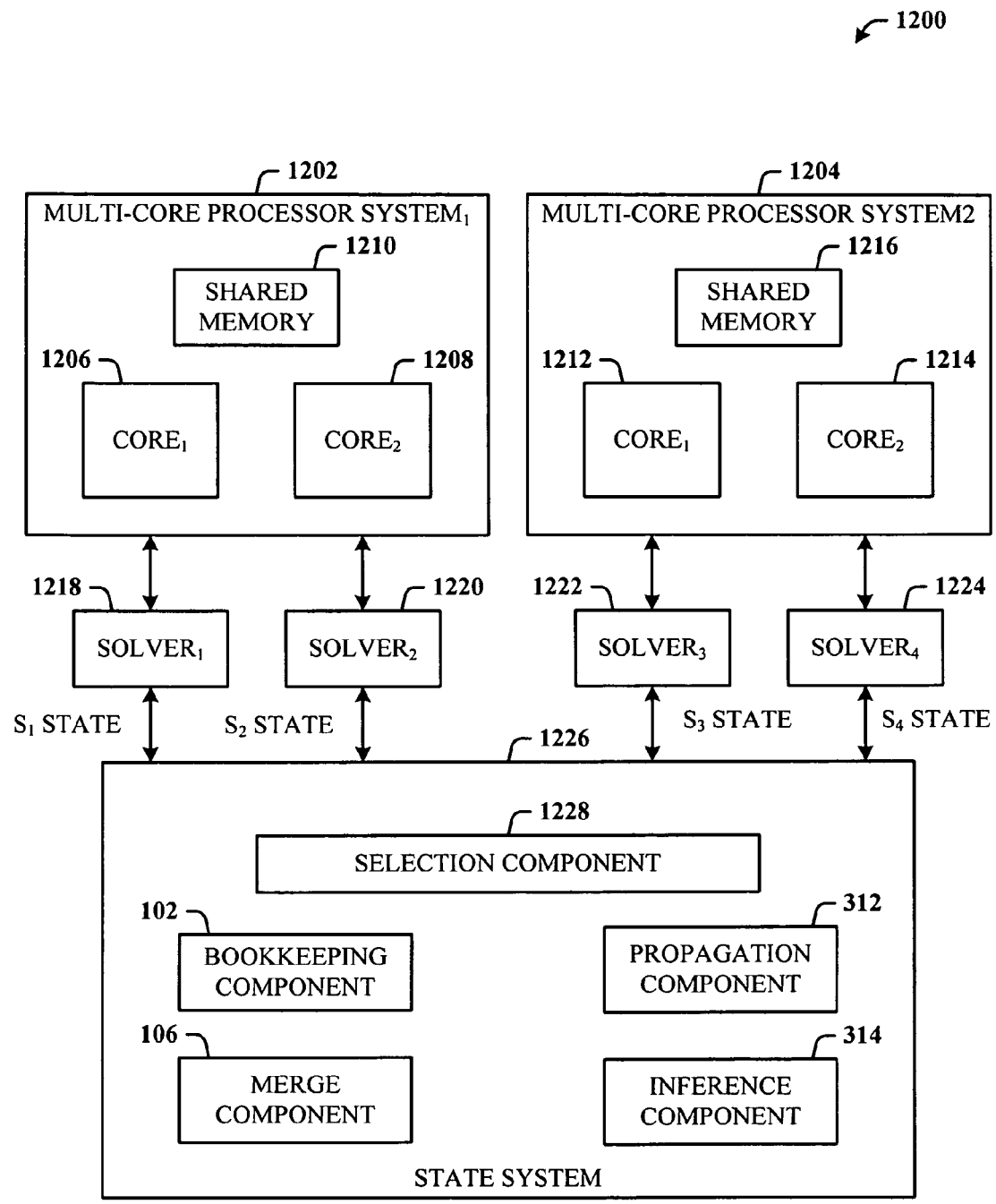
FIG. 12 illustrates a diagram of a system that applies solver state processing in accordance with the subject innovation to multi-core multi-processor systems.

FIG. 12 illustrates a diagram of a system 1200 that applies solver state processing in accordance with the subject innovation to multi-core multi-processor systems. The multi-core multi-processor system 1200 includes a first multi-core processor system 1202 and a second multi-core processor system 1204, each a shared memory parallel processing system. The first processor system 1202 includes a first processing core 1206 (denoted $CORE_1$) and a second processing core 1208 (denoted $CORE_2$), both fabricated on the same die and sharing a shared memory 1208 for shared buffering of a computational thread that is being processed.

The second multi-core processor system 1204 includes a first processing core 1212 (denoted $CORE_1$) and a second processing core 1214 (denoted $CORE_2$), both fabricated on the same die and sharing a shared memory 1216 for shared buffering of a computational thread that is being processed.

In support of shared thread processing by each of the cores (1206 and 1208), corresponding sets of solvers are provided. For example, a first solver 1218 (denoted $SOLVER_1$) and a second solver 1220 (denoted $SOLVER_2$), both of which can be CSP solvers, for example, are provided to perform constraint processing during thread execution among the multiple cores (1206 and 1208) of the processor system 1202. Similarly, in support of shared thread processing by each of the cores (1212 and 1214), corresponding sets of solvers are provided. For example, a third solver 1222 (denoted $SOLVER_3$) and a fourth solver 1224 (denoted $SOLVER_4$), both of which can be CSP solvers, for example, are provided to perform constraint processing during thread execution among the multiple cores (1212 and 1214) of the processor system 1204.

Each of the solvers (1218, 1220, 1222 and 1224) passes solver state to a state processing system 1226. For example, solver state (denoted $S_1$ STATE and $S_2$ STATE) is forwarded from the first processor system 1202 to the state system 1226 and solver state (denoted $S_3$ STATE and $S_4$ STATE) is forwarded from the second processor system 1204 to the state system 1226.

The state system 1226 is provided for pairwise support graph processing in accordance with the disclosed innovation. The state system 1226 provides pairwise processing of solver state received from the parallelized solvers (1218, 1220, 1222 and 1224) in the form of support graphs. For example, in such multi-core multi-processor systems thread computation processing can occur across any combination of the cores (1206, 1208, 1212 and 1214). For example, processing can occur using cores 1208, 1212 and 1214. Accordingly, states from these three cores should be passed to the state system 1226 for pairwise processing in accordance with the disclosed algorithms. In support thereof, the state system 1226 can include a selection component 1228 for selecting related state from each of the solvers (1218, 1220, 1222 and 1224) based on the thread undergoing state processing. In other words, unrelated state will not be selected for support graph processing. However, it is to be understood that state processing can now be performed in parallel as well, by include an additional state system (not shown) such that one state system is dedicated to each processor system (1202 or 1204).

As before, the state system 1226 can further include the bookkeeping component 102, merge component 106, propagation component 312 and inference component 314 described supra for accomplishing the support graph reduction (or paring), support graph merging, conflicts processing, and variable assignments.

Additionally, it is to be appreciated that the state system 1226 can be implemented strictly in software, strictly in hardware (e.g., ASIC, FPGA), or as a combination of both hardware and software.

The state systems (1114 of FIG. 11 and/or 1226) can also be implemented as a standalone software and/or hardware pluggable modules for installation into a computing system for the handling of solver state. For example, a card with a high-speed interface and memory (e.g., non-volatile or flash) can be employed for suitable interface to a processor subsystem and for solver state processing. Alternatively, or in combination therewith, a software module can be installed that processes solver state in accordance with the disclosed innovation.

Figure 13:
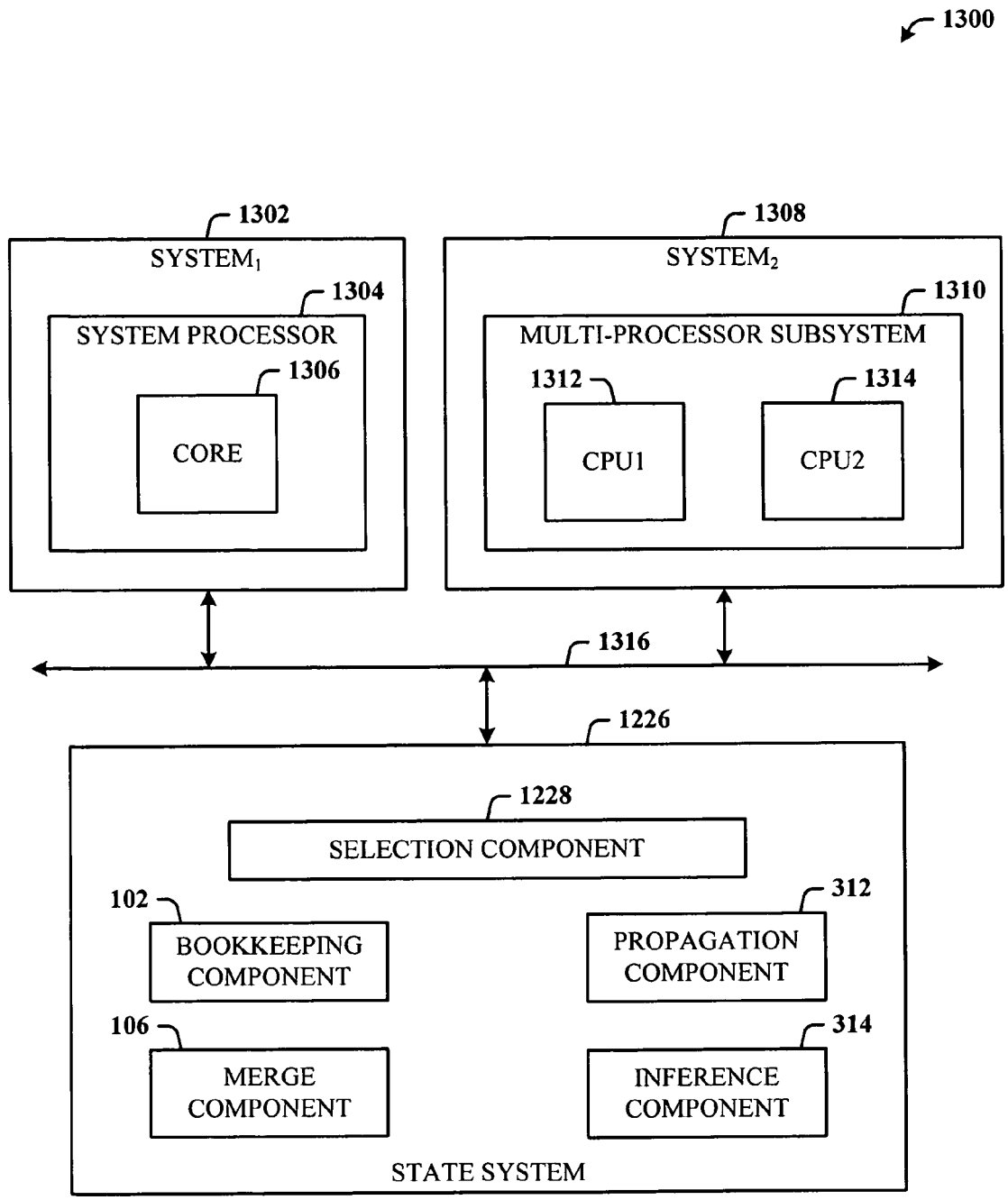
FIG. 13 illustrates a diagram of a system that applies solver state processing in accordance with the subject innovation to solver state processing across separate computing systems.

FIG. 13 illustrates a diagram of a system 1300 that applies solver state processing in accordance with the subject innovation to solver state processing across separate computing systems. Here, a first computing system 1302 is a single-processor system having a system processor 1304 (and a single core 1306) for performing program and data processing. A second computing system 1308 is a multi-processor system having a multi-processor subsystem 1310 (and two processors 1312 and 1314) for performing program and data processing. The systems (1302 and 1308) are disposed in communication on a network 1316 (or suitable high-speed interface) and further, in communications with the state system 1226 of FIG. 12 for solver state processing. If a thread is processed across both systems (1302 and 1308), solver state can be processed from both systems similar to the description provided above in FIG. 12.

Figure 14:
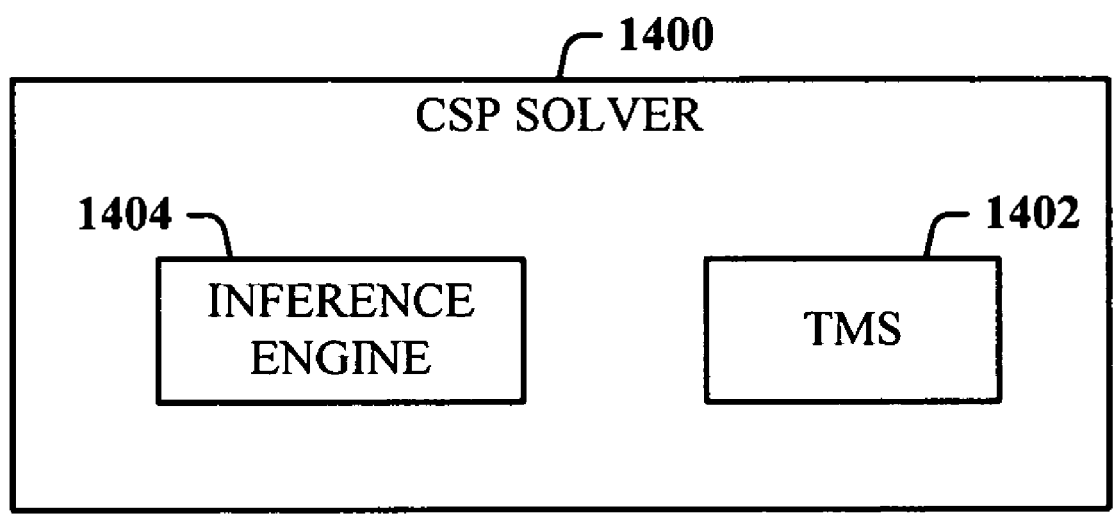
FIG. 14 illustrates a diagram of a CSP solver system that employs a truth maintenance system and an inference engine for application as a problem solver in a large search space.

FIG. 14 illustrates is a diagram of a CSP solver system 1400 that employs a truth maintenance system 1402 and an inference engine 1404 (using learning and reasoning) for application as a problem solver in a large search space. The engine 1404 explores alternatives, makes choices, and analyzes the choices for correctness. When a conflict occurs, the truth maintenance system facilitates elimination of the conflict, and updates its knowledge base accordingly, for future use.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 15:
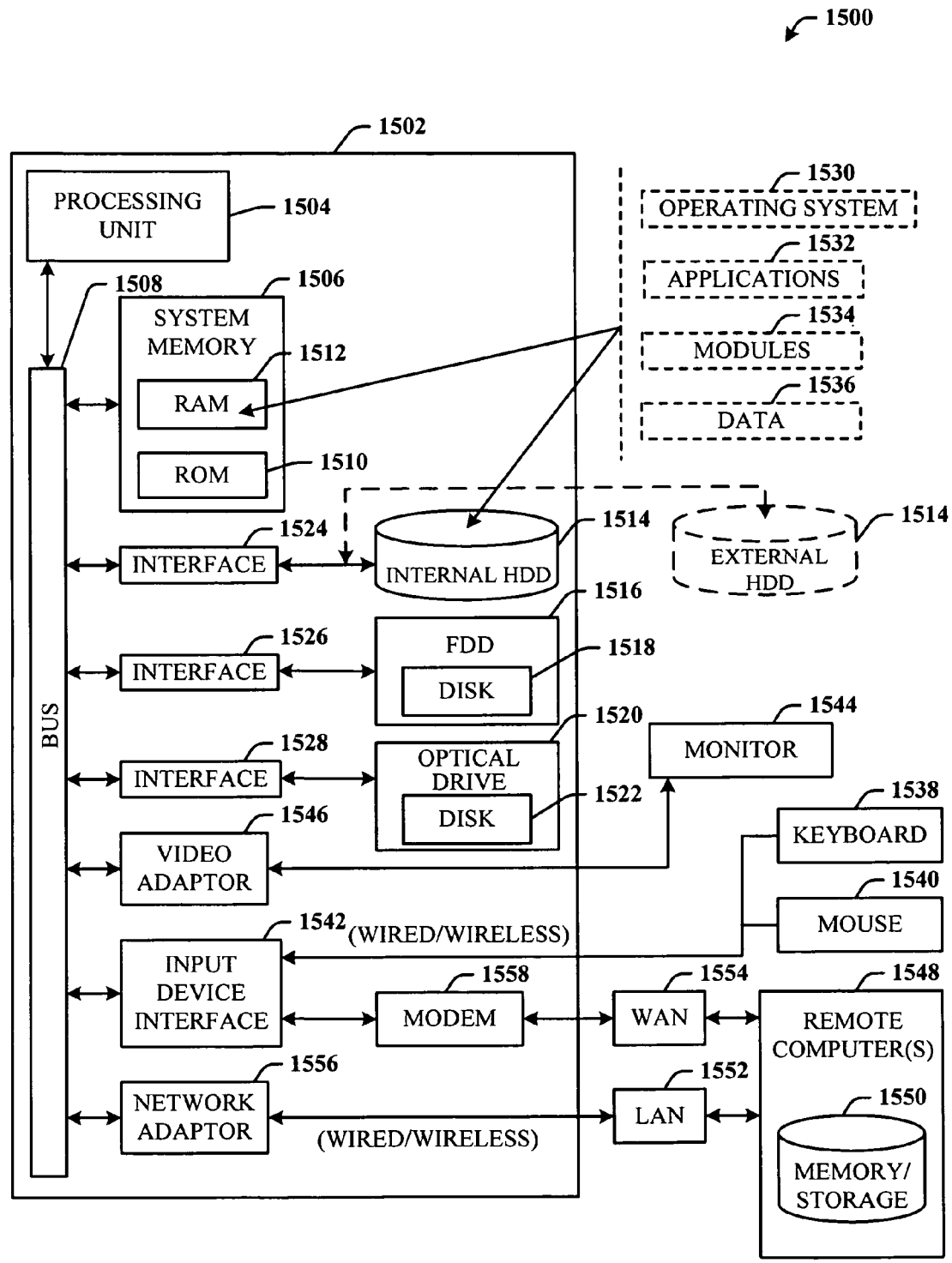
FIG. 15 illustrates a block diagram of a computing system operable to employ the disclosed parallelized solver state architecture.

Referring now to FIG. 15, there is illustrated a block diagram of a computing system 1500 operable to employ the disclosed parallelized solver state architecture. In order to provide additional context for various aspects thereof, FIG. 15 and the following discussion are intended to provide a brief, general description of a suitable computing system 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary computing system 1500 for implementing various aspects includes a computer 1502, the computer 1502 including a processing unit 1504, a system memory 1506 and a system bus 1508. The system bus 1508 provides an interface for system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532 (e.g., the lock-free CSP solver processing systems described above), other program modules 1534, and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, for example, a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 16:
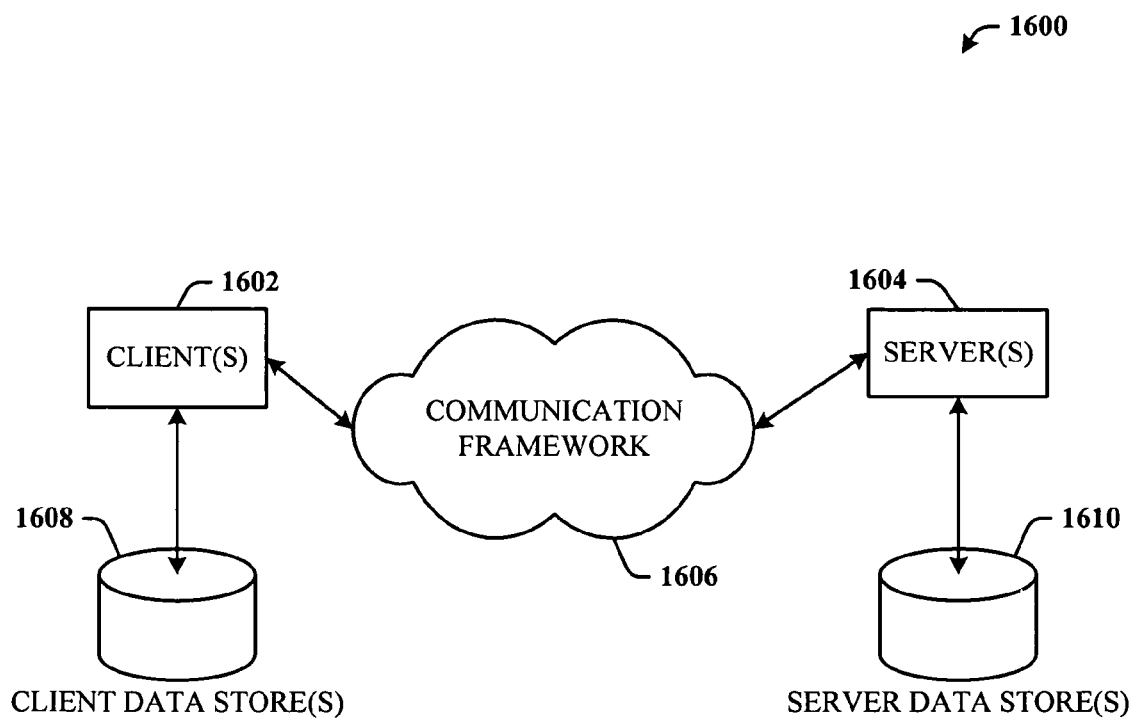
FIG. 16 illustrates a schematic block diagram of an exemplary computing environment that can exploit parallelized solver processing according to the disclosed innovation.

Referring now to FIG. 16, there is illustrated a schematic block diagram of an exemplary computing environment 1600 that can exploit parallelized solver processing according to the disclosed innovation. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the architecture, for example. One possible communication between a client 1602 and a server 1604 can be in the form of a data packet adapted to be transmitted between two or more computer processes in support of parallelized solver state processing. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates constraint solver processing, comprising:
    a bookkeeping component for representing input solver state of a computational thread as a set of graphs, the input solver state received from parallel solvers operating on the computational thread;
    a merge component for pairwise merging of at least two input graphs of the set of graphs into a merged graph that represents final state of the computational thread;
    a propagation component for constraint propagation to generate completeness in the merged graph, wherein the propagation component facilitates non-chronological backtracking as part of the constraint propagation to directly change an earlier assumption without changing an intermediate assumption and the propagation component facilitates adding more than one learned constraint during constraint propagation of the merged graph for the parallel solvers, which are parallel SAT solvers, wherein the representing input set of support graphs to be merged by the merge component are conflict-free support graphs.

2. The system of claim 1, wherein the bookkeeping component receives the input solver state from parallel Boolean satisfiability (SAT) solvers operating on the computational thread.

3. The system of claim 1, wherein the bookkeeping component receives the input solver state from parallel constraint satisfaction problem (CSP) solvers operating on the computational thread.

4. The system of claim 3, wherein the CSP solvers are defined according to a lattice of valuations A and a set of values D, where D and A are the same set.

5. The system of claim 1, wherein the merge component merges the input solver state into the merged graph in a lock-free manner.

6. The system of claim 1, further comprising a learning and reasoning component for inferring a variable assignment based on a guess during a constraint propagation process.

7. The system of claim 1, wherein the input solver state is from two parallel SAT solvers operating on the computational thread, and the merge component facilitates adding n new and distinct literals to each of n copies of an L-complete, K-consistent deduction graph, where n is a positive integer.

8. A computer-implemented method of constraint solver processing, comprising:
    representing input solver state of a computational thread as a set of support graphs;

receiving the support graphs associated with solver state of parallel solvers, the solver state associated with processing of the computational thread;

paring a support graph from each of the parallel solvers for merging of nodes having same literal;

pairwise merging the support graphs into a merged graph that represents final state of the computational thread;

solving completeness of the merged graph by propagating constraints utilizing non-chronological backtracking as part of the constraint propagation to directly change an earlier assumption without changing an intermediate assumption;

adding more than one learned constraint during constraint propagation of the merged graph for the parallel solvers, which are parallel SAT solvers; and processing conflicting literals of the merged graph to make the merged graph conflict-free.

9. The method of claim 8, further comprising paring down the support graphs for the pairwise merging according to nodes having same literals.

10. The method of claim 8, further comprising manipulating the support graphs of the respective parallel solvers simultaneously.

11. The method of claim 8, further comprising eliminating a conflicting literal from a set of conflicting literals and designating remaining conflicting literals of the set as assumptions for a new deduction graph.

12. The method of claim 8, wherein the parallel solvers are Boolean SAT solvers.

13. A computer-implemented solver system, comprising:

computer-implemented means for representing input solver state of a computational thread as a set of support graphs;

computer-implemented means for receiving the support graphs from parallel CSP solvers, the support graphs representative of parallel solver state associated with processing of the computational thread;

computer-implemented means for paring support graphs from each of the parallel CSP solvers;

computer-implemented means for pairwise merging the support graphs into a merged graph;

computer-implemented means for eliminating conflicts in the merged graph to output a conflict-free merged graph that represents final state of the computational thread;

computer-implemented means for solving completeness of the merged graph by propagating constraints utilizing non-chronological backtracking as part of the constraint propagation to directly change an earlier assumption without changing an intermediate assumption; and computer-implemented means for adding more than one learned constraint during constraint propagation of the merged graph for the parallel solvers, which are parallel SAT solvers.

* * * * *